(12) United States Patent
Hartsfield, Jr.

(10) Patent No.: US 7,094,008 B2
(45) Date of Patent: Aug. 22, 2006

(54) POWER DRIVER BIT SELF-CENTERING AND POSITIONING APPARATUS

(76) Inventor: William Richard Hartsfield, Jr., P.O. Box 36, 2870 Spring Dr., Middleburg, FL (US) 32050-0036

( * ) Notice: Subject to any disclaimer, the term of this patent is extended or adjusted under 35 U.S.C. 154(b) by 136 days.

(21) Appl. No.: 10/858,426

(22) Filed: Jun. 1, 2004

(65) Prior Publication Data

US 2005/0265799 A1 Dec. 1, 2005

(51) Int. Cl.
*B23B 45/14* (2006.01)

(52) U.S. Cl. ............... 408/103; 408/108; 408/110; 409/179

(58) Field of Classification Search ............. 408/88, 408/95, 103, 105, 108, 110, 111, 112, 712; 409/179, 180

See application file for complete search history.

(56) References Cited

U.S. PATENT DOCUMENTS

| | | | | |
|---|---|---|---|---|
| 1,255,507 A | 2/1918 | Brennan | | 33/367 |
| 1,357,462 A | 11/1920 | Lund | | 33/454 |
| 1,410,196 A | 3/1922 | Krivacs | | 33/520 |
| 2,997,900 A | * 8/1961 | Pugsley | | 408/95 |
| 3,874,810 A | * 4/1975 | Russell | | 408/14 |
| 3,958,893 A | * 5/1976 | Boyajian | | 408/112 |
| 4,572,715 A | * 2/1986 | Wolff | | 409/180 |
| 4,585,376 A | * 4/1986 | Davenport et al. | | 408/110 |
| 4,669,923 A | 6/1987 | Wilcox, Jr. | | 408/1 R |
| 5,062,747 A | * 11/1991 | Chen | | 408/115 R |
| 5,437,105 A | 8/1995 | Work | | 33/644 |
| 5,797,708 A | * 8/1998 | Bencic | | 408/112 |
| 2002/0060386 A1 | 5/2002 | Konieczny | | 269/56 |

* cited by examiner

Primary Examiner—Boyer D. Ashley
Assistant Examiner—Ali Abdelwahed
(74) Attorney, Agent, or Firm—Jonathan R. Smith

(57) ABSTRACT

A portable combined clamp and bit guide assembly guides a bit, turned by a power driver, into the exact center between the opposing faces of the clamp. The clamp is designed to hold workpieces having substantially parallel edges and a substantially linear centerline on their upper surfaces, and provides a drill path perpendicular to that centerline. An optional incline adapter supports the clamp and bit guide at an angle to the workpiece, while also aiding in support of the workpiece itself. The entire assembly may be carried in a single case with a power driver and bits.

8 Claims, 15 Drawing Sheets

POWER DRIVER BIT SELF-CENTERING AND POSITIONING APPARATUS

BACKGROUND OF INVENTION

This invention has to do with the art of cutting by the use of a rotating, axially-moving tool, such as a drill, the art of work holders, and the art of geometrical instruments.

Drilling a straight hole through a precise spot in a workpiece at a precise angle requires careful and rigid positioning of the drill bit and the workpiece. A hand-held power driver drills holes quickly, but the entry point of the bit and the bit direction may meander. A common solution, where it can be used, is a drill press. In a drill press, the spinning chuck assembly is held and moved along a single, usually vertical, axis through bearings that are fixed in a heavy mount. A drill or other bit is mounted in the chuck and is advanced downward into the work by a rack that can move only up and down. Before drilling, the workpiece is carefully positioned beneath the bit and held or clamped in place so that the bit will enter the work precisely where desired and advance through the work in a precise direction relative to the workpiece. The location and direction of the drilling is usually measured and marked in advance on the workpiece so that it may be seen clearly by the operator.

Over many years, various levels of sophistication have been added to the drill press concept, usually to improve speed and efficiency as well as precision in manufacturing operations. These include devices for automated positioning of the work and the employment of multiple cutters moving along multiple axes. Milling machines, for example, have been developed which permit machining coordinates to be entered from digitally-rendered drawings, and the cutters and the workpiece are moved automatically relative to one another along a computed set of coordinates by mechanical positioners until all surfaces and holes are properly cut into the workpiece.

No such sophisticated device is economically available to hand driver users. One simple device, however, for improving the precision of a hand drill is U.S. Pat. No. 4,669,926 to Wilcox, Jr. It describes a guide for a hand drill incorporated into a vise. A tube, with an internal diameter sized to slip fit around a particular drill bit, is positioned by hinged arms over a point centered between the faces of the vise. The vise holds the workpiece, and the tube limits the amount of meandering the bit can do as it is pushed downward into the workpiece.

Geometrical instruments are a separate class of art in which physical representations of geometric entities (points, lines, planes, and solids) are employed to define other geometric entities. (For example, two straightedges may be laid across each other to define a point.) U.S. Pat. No. 5,437,105 to Work exemplifies this type of device. It describes a mechanical device for finding the center of an elongate workpiece having a flat upper surface and straight, but not necessarily parallel, sides. Two straight arms with tracks within them are aligned with the sides of the workpiece. Cross arms which intersect at their centers have ends that ride in the tracks. The intersection of the cross arms will always lie centered between the sides of the workpiece. At that intersection is a scribing pin to mark a point equidistant between the sides of the workpiece.

The above mentioned patent to Wilcox, Jr., combines the art of geometrical instruments with those of cutting and work holding. It allows the user to drill a fairly precisely located hole through the center of a workpiece held by a vise, but being incorporated into the vise, it does not adequately provide for portability. It also relies on a cylindrical drill guide, a tube having a diameter matched to the drill bit being used with it. Such a guide allows some play in the position of the drill bit tip and the angle of drilling. Moreover, a separate drill guide must be used with each different size of drill bit, and such guides may not be used with bits that have an end diameter larger than the shank.

There is also a need for a device, capable of holding both the work and the driver, which will also permit precise drilling at an angle other than vertical.

Another need not met by the prior art is to provide a precise guide for a portable power driver that can be moved around on a large surface with little effort.

SUMMARY OF INVENTION

This invention provides a portable combined clamp and bit support that guides a bit, turned by a power driver, into the exact center between the opposing faces of the clamp. The clamp is designed to hold workpieces having substantially parallel edges and a substantially linear centerline on their upper surfaces, and provides a drill path perpendicular to that centerline. An incline adapter is also provided to support the clamp and bit guide at an angle to that centerline, while also aiding in support of the workpiece itself. The entire assembly may be carried in a single case with a power driver and bits.

An object of this invention is to provide a portable clamp for workpieces which holds both a workpiece and a power driver such as a drill in a fixed relative orientation so that the rotating tool moves along a fixed and precise axial path into the workpiece. It is a further object of this invention to place such path in the centerline between the clamp jaws. Another object of the invention is to allow precise drilling at an angle to the surface of the workpiece. Another object of the invention is to provide a precise guide for a portable power driver that can be moved around on a large surface, for example to drill multiple precise holes in a large tabletop in a curved path or in a line parallel to one of the tabletop edges.

DETAILED DESCRIPTION

Figure 1:
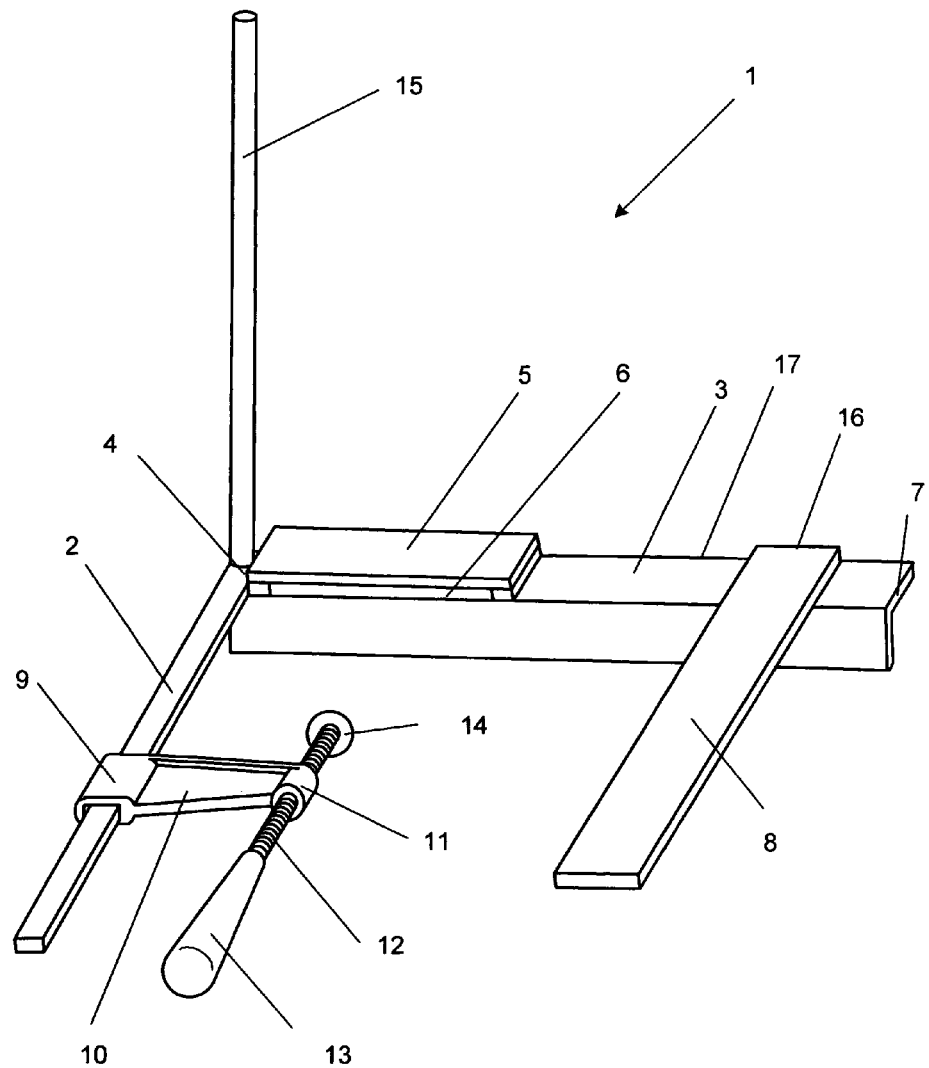
FIG. 1 is a perspective view of a subassembly comprising half of the clamping portion of the invention.

FIG. 1 is a perspective view of a first subassembly 1 comprising half of the clamping portion of the invention. It consists of a vertical slide rod 15, a slide rail 2, and a clamp iron 3, all fixed rigidly together at mutual right angles. The slide rod 15 is preferably of a round cross-section, the slide rail 2 is preferably of a rectangular cross-section, and the clamp iron 3 is preferably of an L-shaped cross-section, commonly referred to as "angle iron". At the end of the clamp iron proximal to the junction point 4 of these three parts and rigidly connected to the upper surface of the clamp iron 3 is a sleeve 5 forming a slot 6. Rigidly affixed to the clamp iron 3 near its distal end 7 is a rigid slot bar 8, extending in the same direction from the clamp iron 3 as slide rail 2, and parallel to slide rail 2. Some length of clamp iron 3 is allowed to protrude to the right of slot bar 8 to provide additional support for a cooperating subassembly described below. Slot bar 8 has a butt end 16, flush with the rear edge 17 of clamp iron 3.

Slide rail 2 also passes through proximal end 9 of sliding arm 10, so that sliding arm 10 can function like the sliding arm of a bar clamp well known in the clamping arts. Like the sliding arm of a typical bar clamp, sliding arm 10 has at its distal end 11 a clamp screw 12 which may be turned by a handle 13, moving a swivel pad 14 along an axis parallel to slide rail 2.

Figure 2:
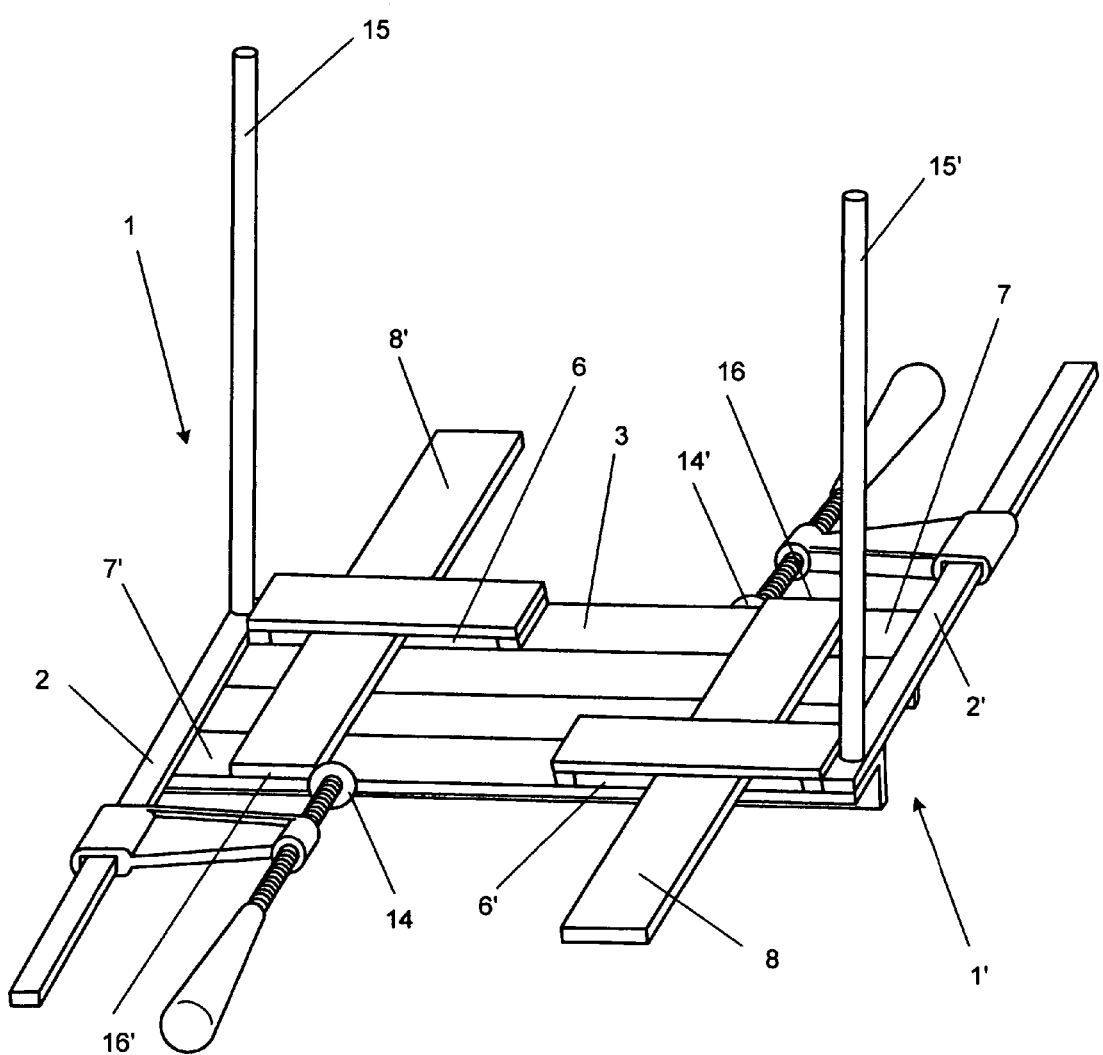
FIG. 2 is a perspective view of two subassemblies from FIG. 1 joined in sliding relation to form the clamping portion of the invention.

FIG. 2 is a perspective view of two subassemblies from FIG. 1 joined in sliding relation to form the clamping portion of the invention. A second subassembly 1', identical to first subassembly 1 in FIG. 1, is slidably attached to subassembly 1 by passing first slot bar 8 through second slot 6', and second slot bar 8' through first slot 6. Pad 14 is thus located near butt end 16' of slot bar 8', and conversely located is pad 14'. Note that the material from which the slot bars and the slots are made is of approximately the same width and thickness as one of the legs of the angle iron. Note also that to maintain the best collimation of the two subassemblies, slide rails 2 and 2', slots 6 and 6', and slot bars 8 and 8' are all at the same height just above clamp irons 3 and 3'. This assures that both slide rails and both slot bars will be parallel and coplanar, and helps assure that both slide rods 15 and 15' will be maintained parallel in the vertical direction. It also allows slide rails 2 and 2' to rest upon the distal ends 7' and 7 of clamp irons 3' and 3, respectively, providing the entire structure with additional rigidity.

Figure 3:
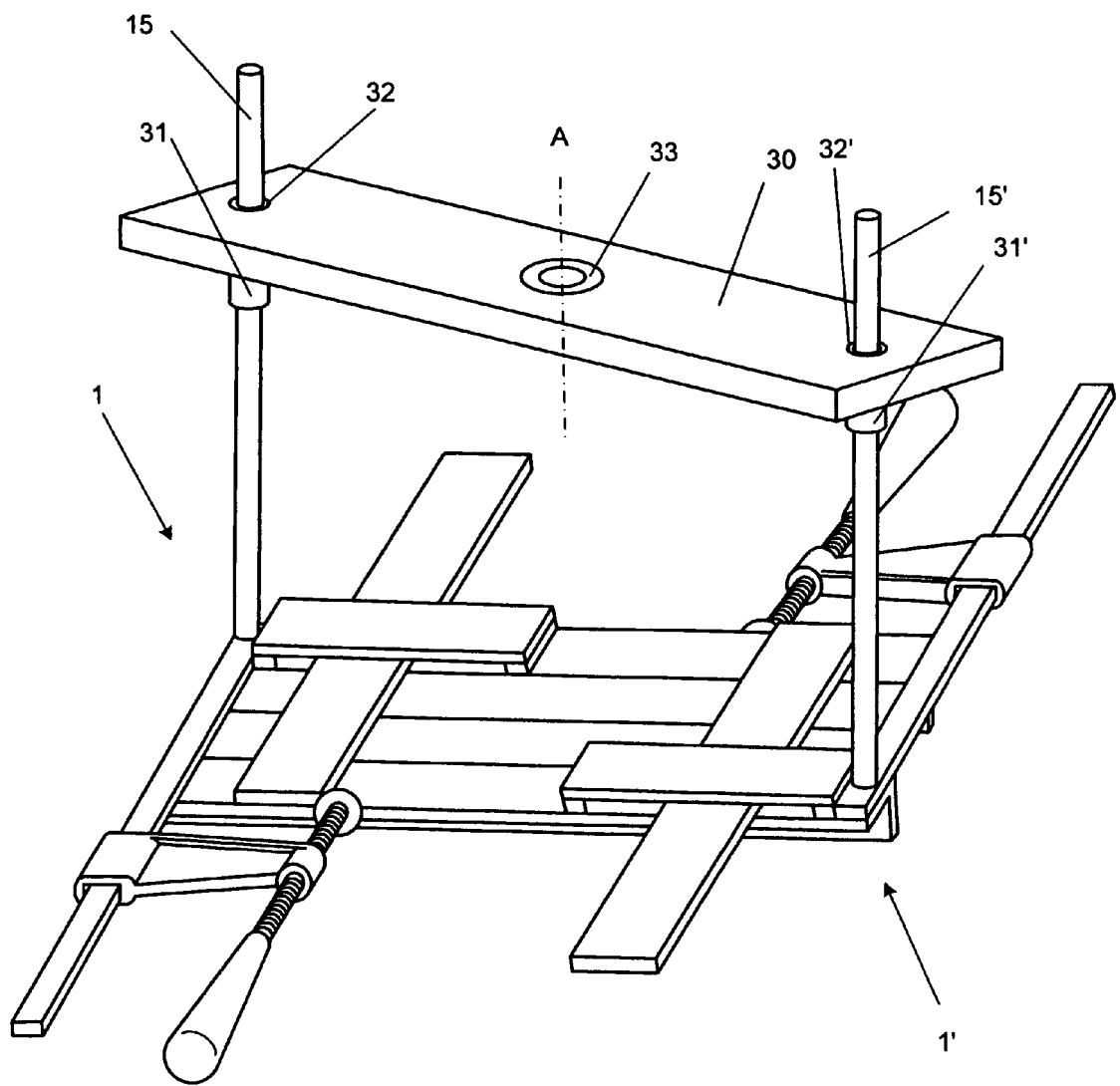
FIG. 3 is a perspective view of the clamping portion of the invention with crossbar attached.

FIG. 3 is a perspective view of the clamping portion of the invention with rigid crossbar 30 slidably attached to the subassemblies 1 and 1'. Slide rod 15 is put through first bushing 31 rigidly fixed in first hole 32, and slide rod 15' is pushed through second bushing 31' rigidly fixed in second hole 32'. The bushings 31 and 31' slip fit the rods 15 and 15'. If the slide rods are made of steel, the bushings should preferably be made of Babbitt metal or other low friction material to allow a tight tolerance yet low friction on the fit between the slide rods and the bushings. The crossbar assembly should ride easily up and down along the slide rods. In the exact center of crossbar 30 is placed a bearing 33. The centerline A of bearing 33 must be parallel with both slide rods 15 and 15'

Figure 4:
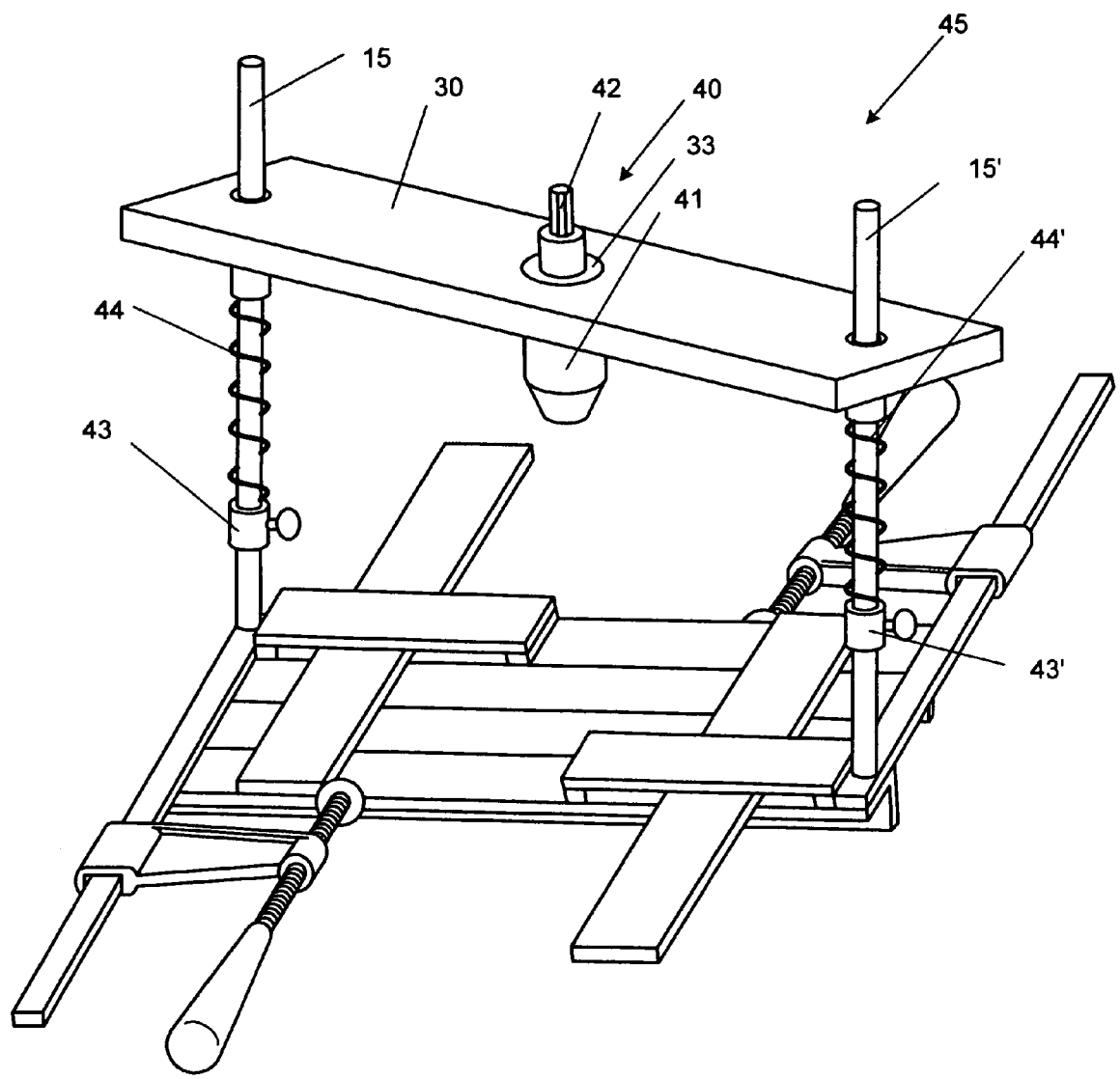
FIG. 4 is a perspective view of the complete first embodiment of the invention.

FIG. 4 is a perspective view of the complete first embodiment of the invention. Note chuck assembly 40 set rotatably in bearing 33. Chuck assembly 40 has a chuck 41 at its lower end to grip a bit, and a shank 42 at its upper end to be turned by a power driver (not shown). Optionally on each slide rod 15 and 15' is a set clamp 43 and 43', respectively, to limit the lowest position of the crossbar 30, and a spring 44 and 44', respectively, to raise the crossbar up after it is pushed down during use.

Figure 5:
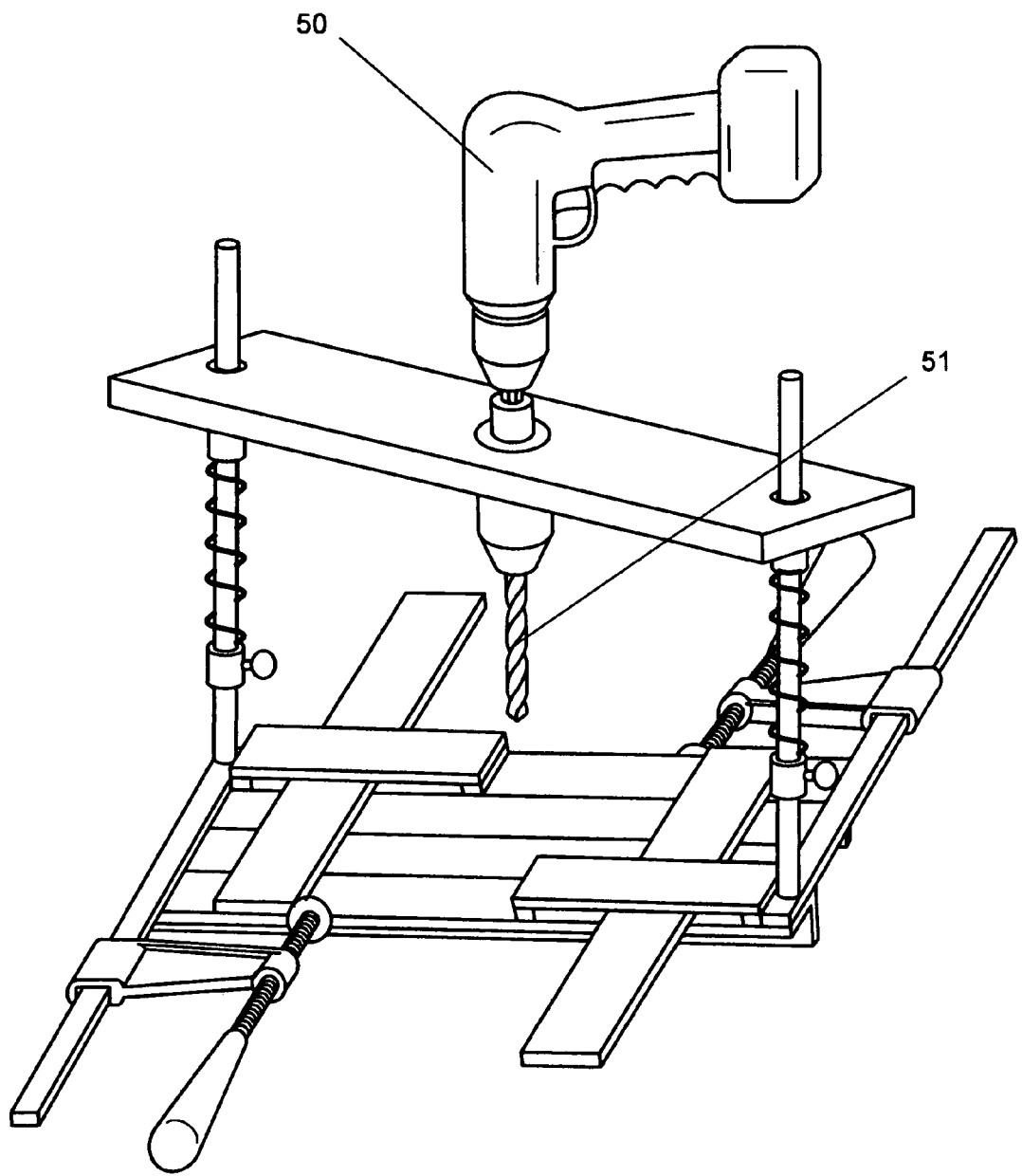
FIG. 5 is a perspective view of the first embodiment with a power driver in place.

FIG. 5 is a perspective view of the first embodiment with a power driver 50 and a drill bit 51 in place.

Figure 6:
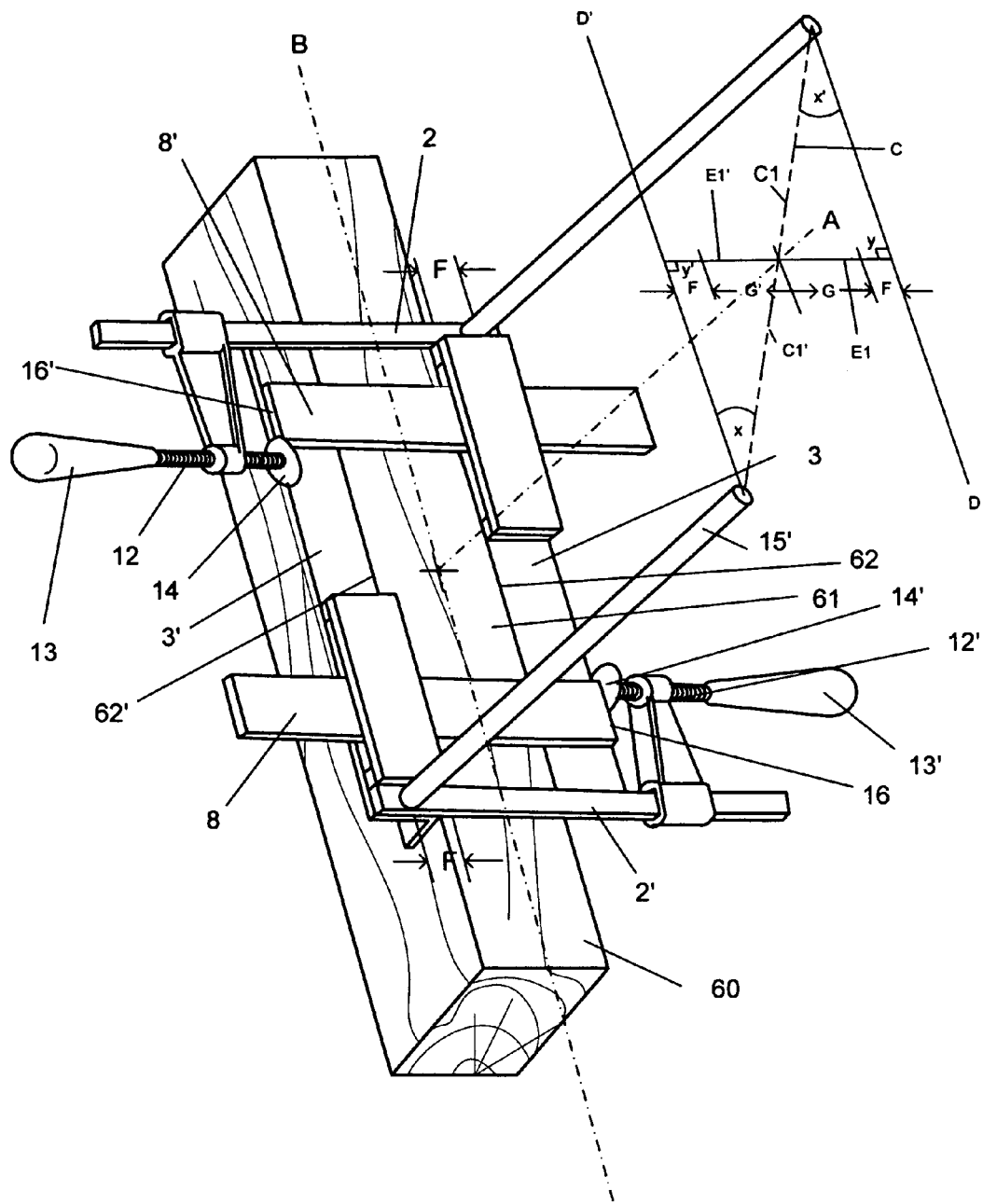
FIG. 6 is a different perspective view of the clamping portion of the invention with a workpiece in position, illustrating the self-centering feature of the invention.

FIG. 6 is a different perspective view of the clamping portion of the invention with a workpiece in position, illustrating the self-centering feature of the invention. A workpiece 60 with a flat upper surface 61 has been placed between opposing clamp irons 3 and 3', and seated firmly upwardly against slide rails 2 and 2' and slot bars 8 and 8'. The workpiece 60 is clamped firmly in place by tightening swivel pads 14 and 14' against butt ends 16' and 16 using handles 13 and 13' to turn screws 12 and 12' respectively. As happens with conventional bar clamps, the reactions of sliding arms 10 and 10' cause them to bind against slide rails 2 and 2', compressing the clamp irons 3' and 3 against the workpiece 60.

It is taken for granted that the center of any diagonal line between two parallel lines will always lie on the centerline between the parallel lines, but here is a proof. The following geometric construction shows that a drill bit moving vertically along the chuck bearing centerline A (at the center of crossbar 30, not shown) will always pass through the centerline B between the parallel edges 62 and 62' of clamp irons 3 and 3'. The first step in the geometric construction is to draw a diagonal line segment C, representing crossbar 30, between the ends of slide rods 15 and 15'. Crossbar 30 is constructed so that the chuck bearing centerline A is at its center, so line A bisects diagonal line segment C by definition, forming equal line segments C1 and C1'. Lines parallel to the true workpiece centerline B are then drawn through the ends of segments C1 and C1' (D and D' respectively). These lines are of course also parallel to each other. The next step is to use the plane geometry theorem that the interior and exterior angles formed by a diagonal crossing two parallel lines must be equal. Thus angles x and x' are equal. Finally, line segment E, perpendicular to the parallels D and D', is drawn through the intersection of A and C. That point divides line E into two segments E1 and E1'. Because E is perpendicular to D and D', angles y and y' are both right angles and therefore equal. Triangles B-C1-E1 and B'-C1'-E1' thus have equal angles x and x', two equal right angles, and equal sides C1 and C2. Another geometric theorem says that triangles having two equal angles and one equal side are congruent. Therefore E1 and E1' are equal. Now, slide rods 15 and 15' are each welded in place the same distance F from edges 62 and 62' on clamp irons 3 and 3'. If distance F is subtracted from the lengths E1 and E1' just shown to be equal, equal lengths G and G' remain, defining the perpendicular distance of the vertical chuck centerline A from clamp iron edges 62 and 62'. The chuck centerline is thus shown to be equidistant from the clamp iron edges, so it must therefore lie on the centerline between the clamp iron edges, no matter how far apart the clamp iron edges are and no matter what the value of angles x and x'.

Figure 7:
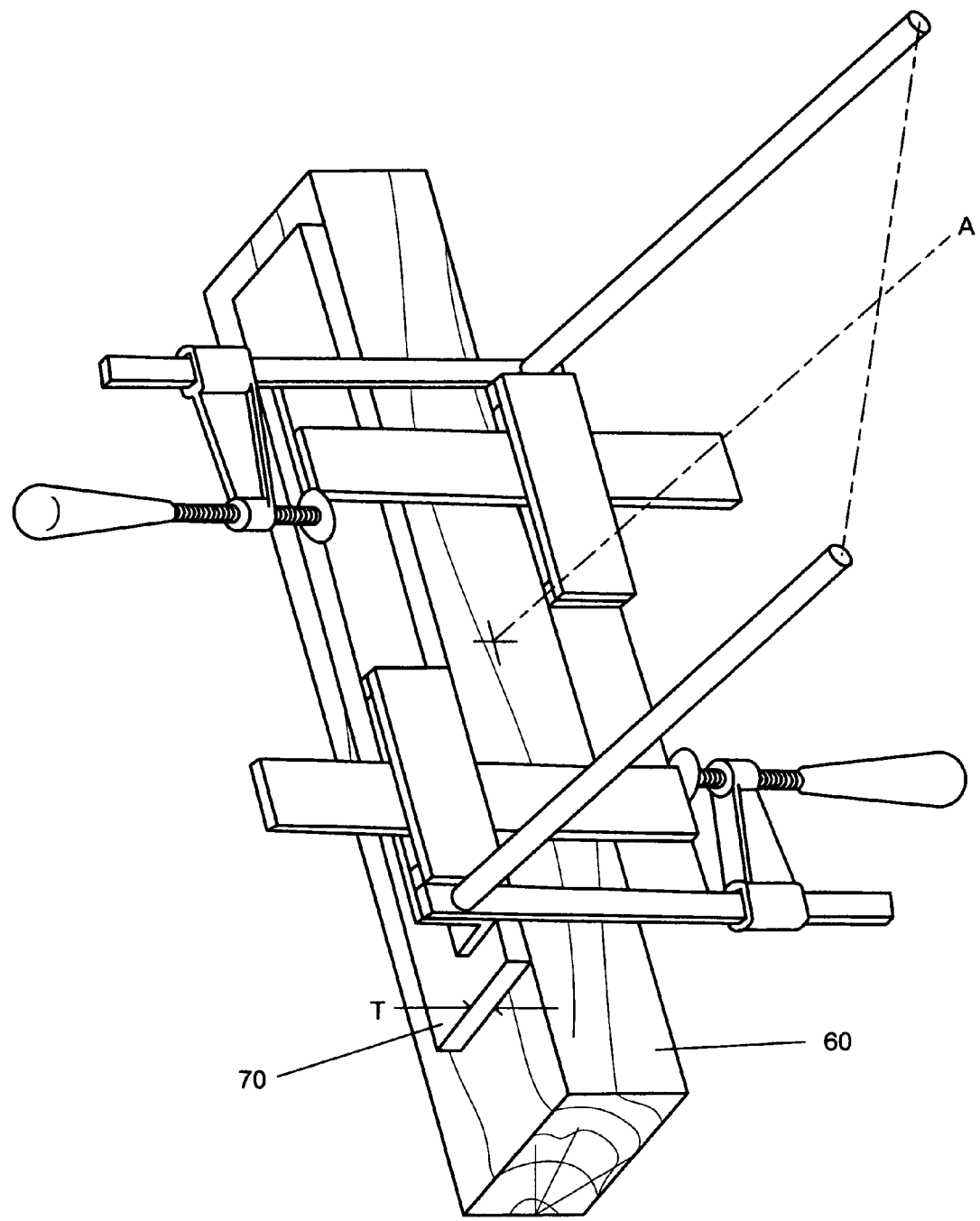
FIG. 7 is a perspective view of the clamping portion of the invention with a workpiece and a shim in the clamp.

FIG. 7 is a perspective view of the clamping portion of the invention with a workpiece and a shim 70 in the clamp alongside the workpiece 60. Placement of a shim of known thickness T as shown moves chuck centerline A a distance T closer to one side of the workpiece 60 if desired.

Figure 8:
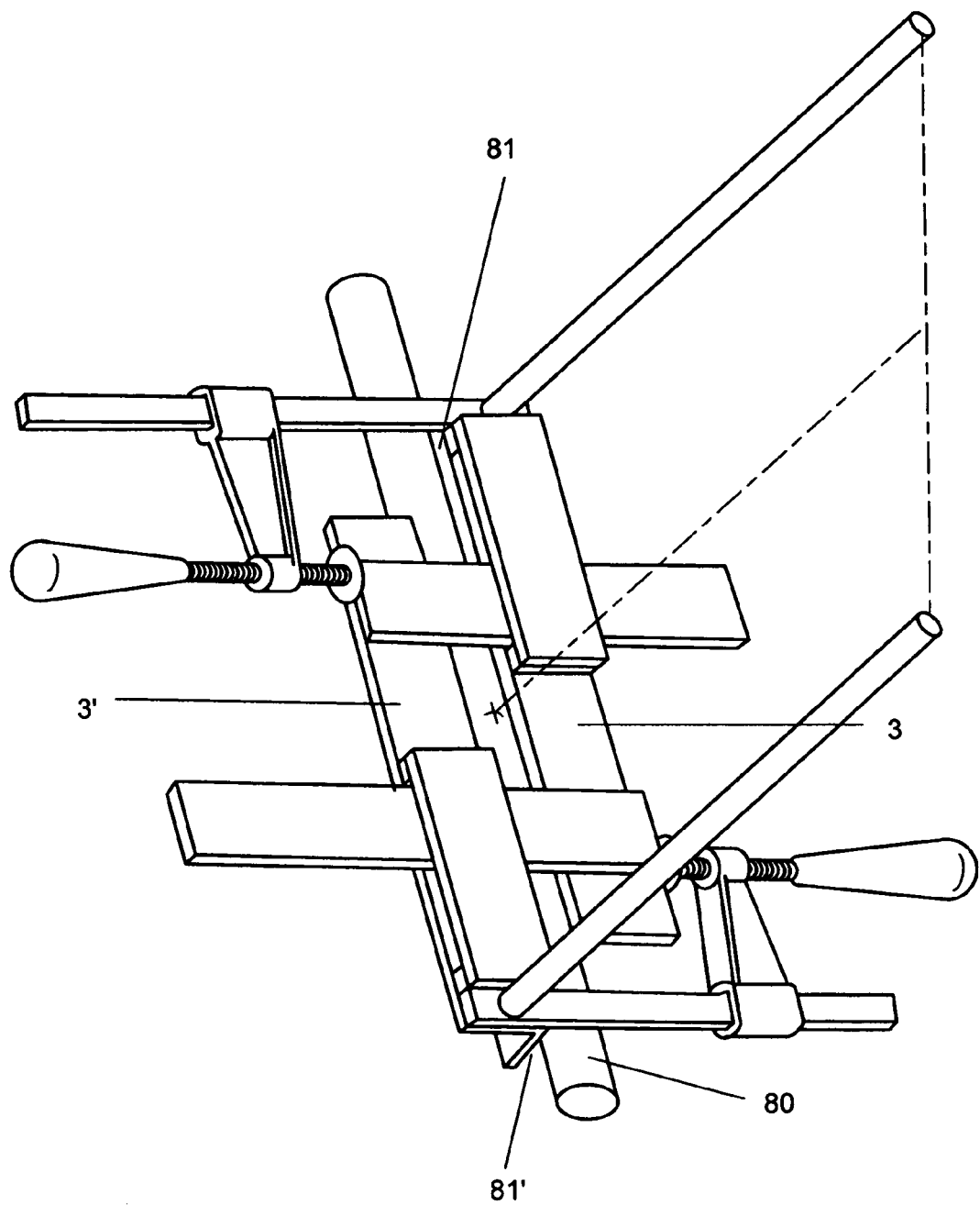
FIG. 8 is a perspective view of the clamping portion of the invention with a cylindrical workpiece in place.

FIG. 8 is a perspective view of the clamping portion of the invention with a cylindrical workpiece 80 in place. (Crossbar 30 in the other views is omitted for visibility of the other parts) As is well known in the art, starting a drill into a convex metal surface such as a pipe wall can be daunting because the bit tip tends to meander away from the highest point, especially when the drill is hand-held with no other support. In this invention, skirts 81 and 81' depending from clamp irons 3 and 3' allow a cylindrical workpiece to be clamped in place. Thus, the invention permits a power driver to be used to drill through the center of workpiece 80 without the drill bit tip meandering away from the center point.

Figure 9:
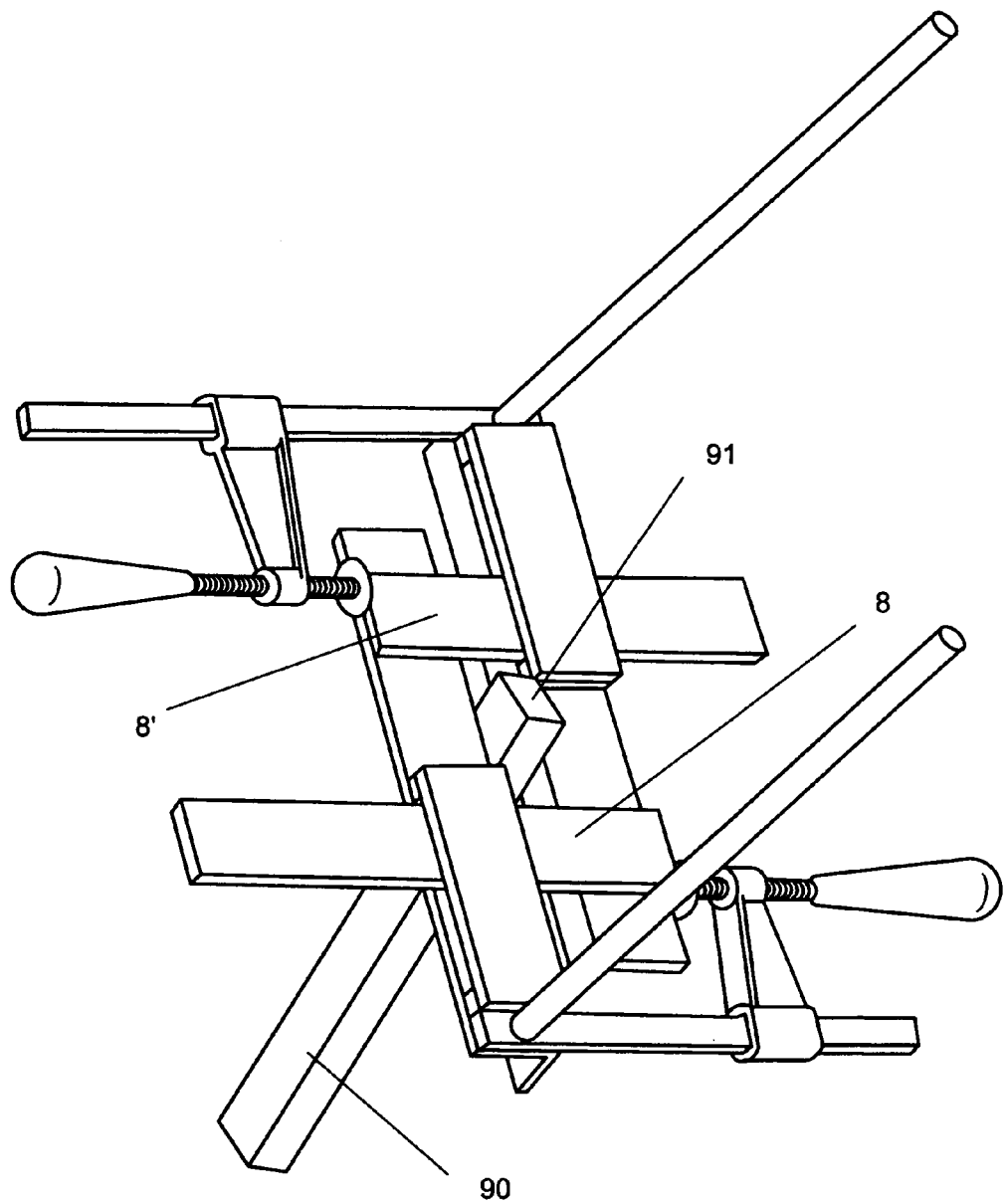
FIG. 9 is a perspective view of the clamping portion of the first embodiment of the invention, clamping the end of an elongate workpiece.

FIG. 9 is a perspective view of the clamping portion of the first embodiment of the invention, clamping an elongate workpiece 90, such as a table leg. Note that this workpiece is too narrow at the end 91 to seat upwardly against the slot bars 8 and 8'. A modification is desirable, as shown in the next figure, to better control the position of such workpieces.

Figure 10:
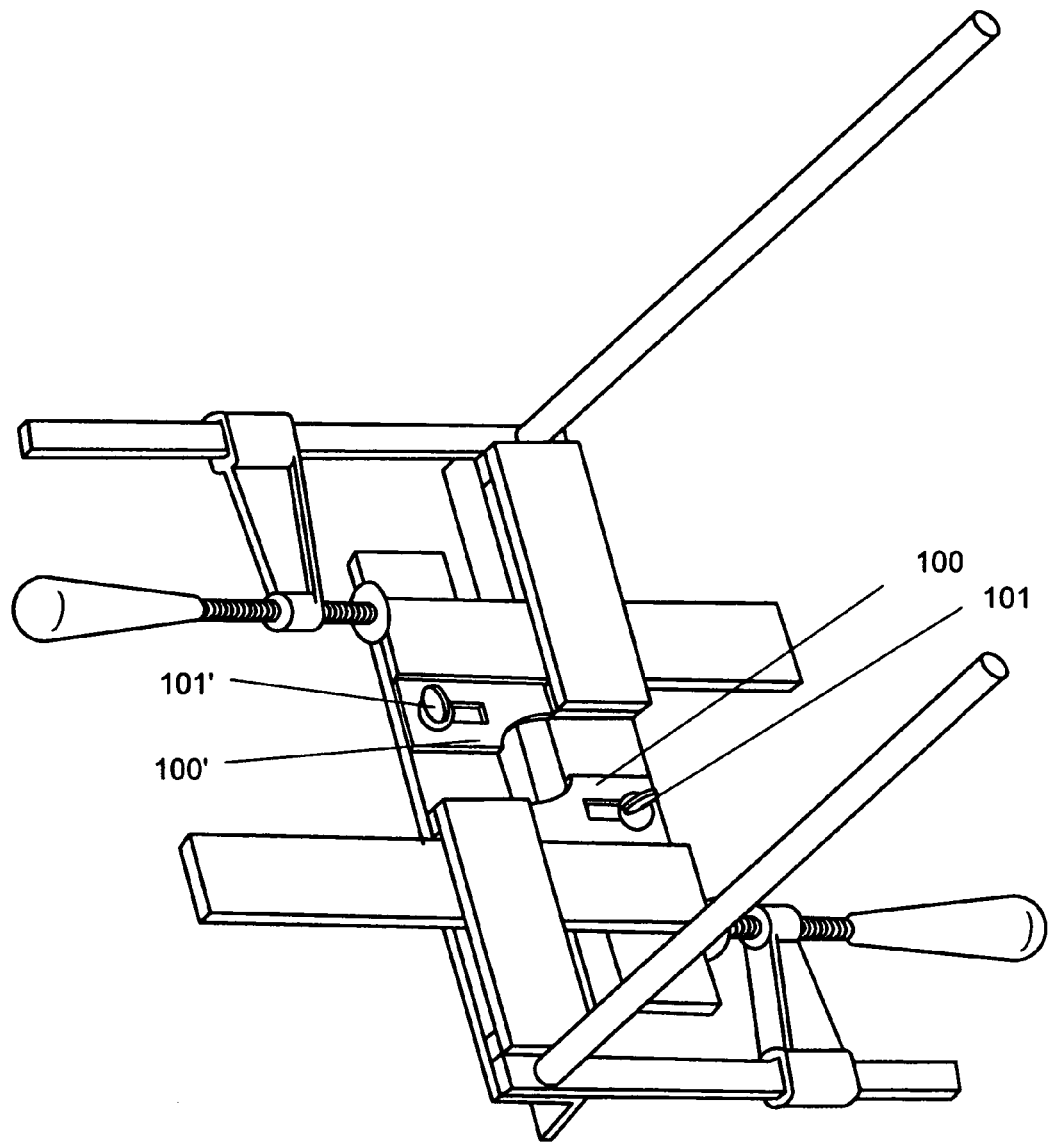
FIG. 10 is a perspective view of the clamping portion of the second, preferred, embodiment of the invention.

FIG. 10 is a perspective view of the clamping portion of the second, preferred, embodiment of the invention. Small stock stops 100 and 100' have been added, being slidably secured to clamp irons 3 and 3' respectively by screws 101 and 101' respectively.

Figure 11:
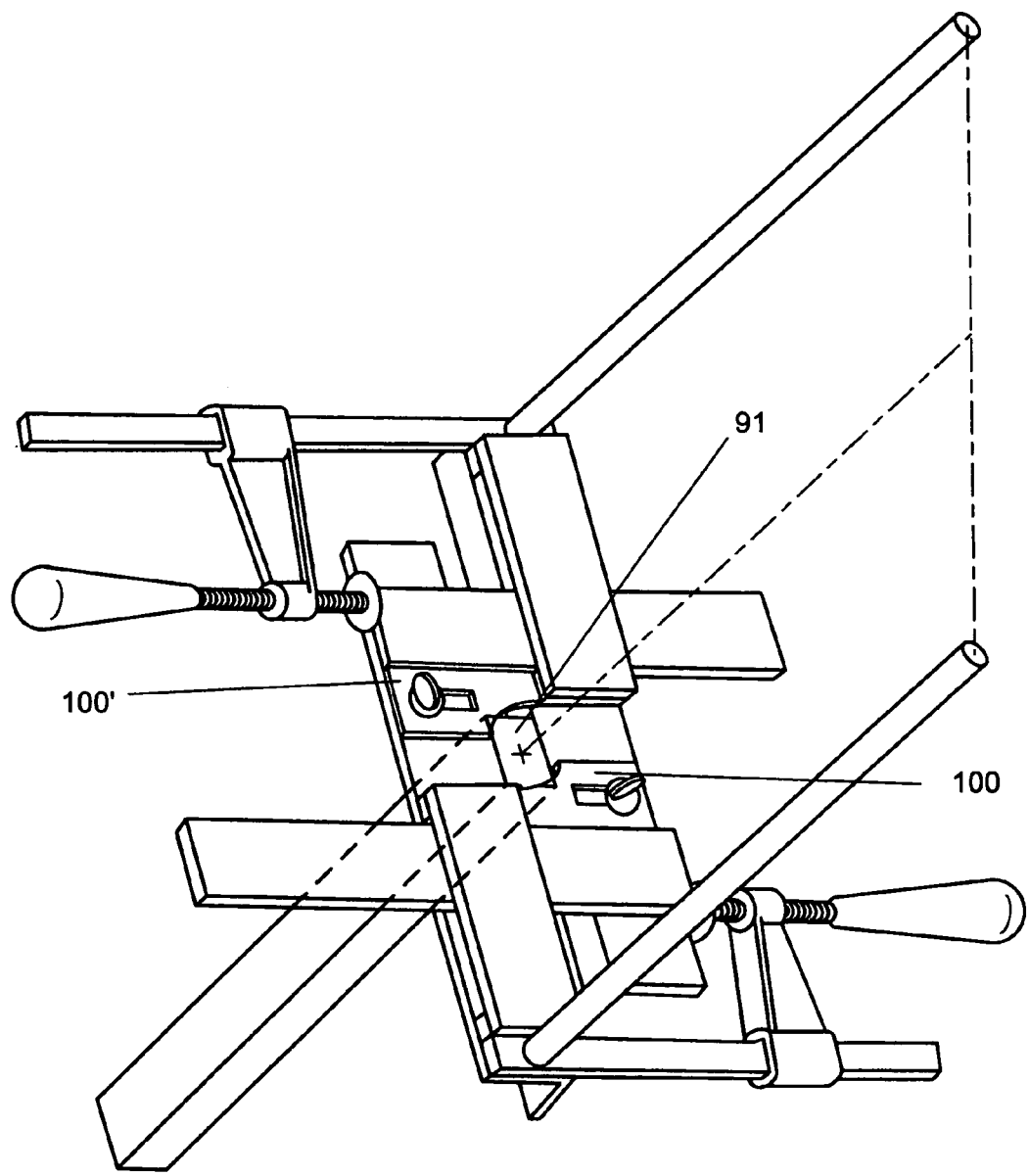
FIG. 11 is a perspective view of the preferred embodiment clamping the end of an elongate workpiece.

FIG. 11 is a perspective view of the preferred embodiment clamping the end of the elongate workpiece 90, showing stops 100 and 100' in use.

Figure 12:
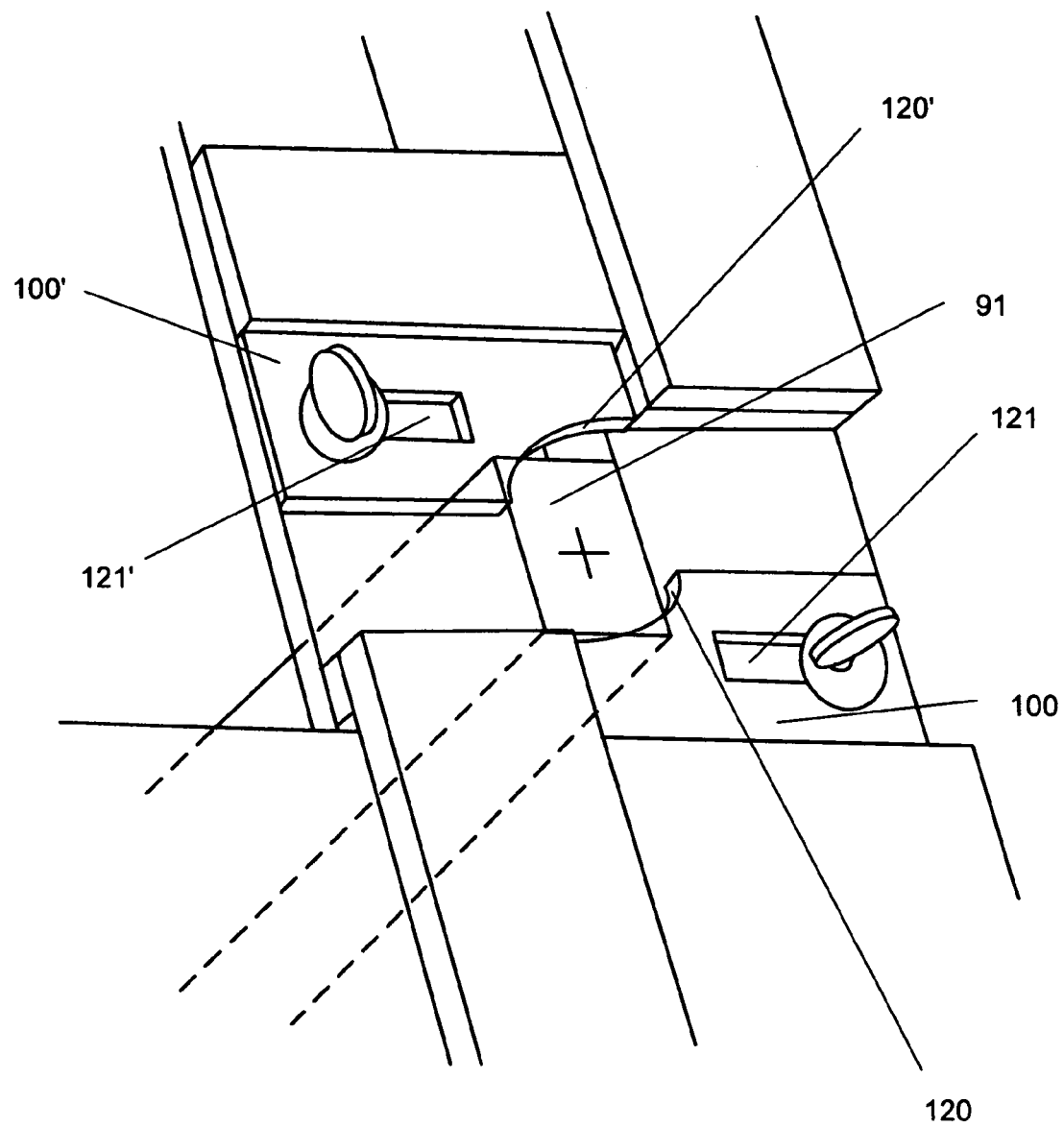
FIG. 12 is a close-up view of FIG. 11.

FIG. 12 is a close-up view of FIG. 11. Curved edges 120 and 120' on stops 100 and 100' permit at least a small portion of workpiece end 91 to be restrained from upward motion within the clamp. Slots 121 and 121' allow stops 100 and 100' to be moved in or out depending on how much of their length is needed.

Figure 13:
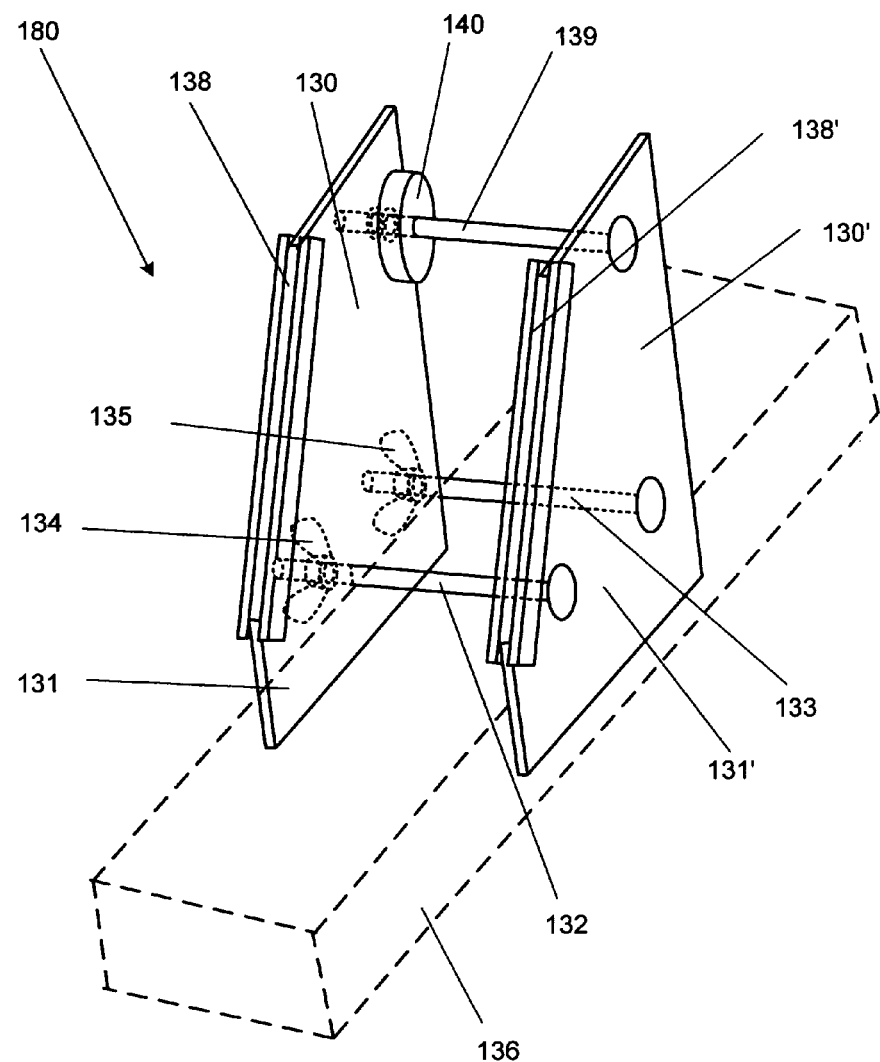
FIG. 13 is a perspective view of an incline accessory to either embodiment of the invention.

FIG. 13 is a perspective view of an incline accessory 180 to either embodiment of the invention, for use in drilling holes through a workpiece at an off-vertical angle. It consists of left and right clamp plates 130 and 130', each having lower flanges 131 and 131', respectively. Front and rear bolts 132 and 133, and wing nuts 134 and 135, respectively, are used to tighten flanges 131 and 131' against a workpiece 136. Left and right inclined guides 137 and 137' are fixed to the inclined front edges of plates 130 and 131, respectively. Guides 137 and 137' have track slots 138 and 138' running lengthwise along them. An upper clamping bolt 139 is also disposed between the clamp plates 130 and 130'. It is used to adjust the space between the upper ends of guides 137 and 137'. An adjusting lock wheel 140, threaded at its center, can be run along threads on bolt 139 to urge guides 137 to a position to accept the track slots (not shown) of either embodiment of the invention (see FIG. 14).

Figure 14:
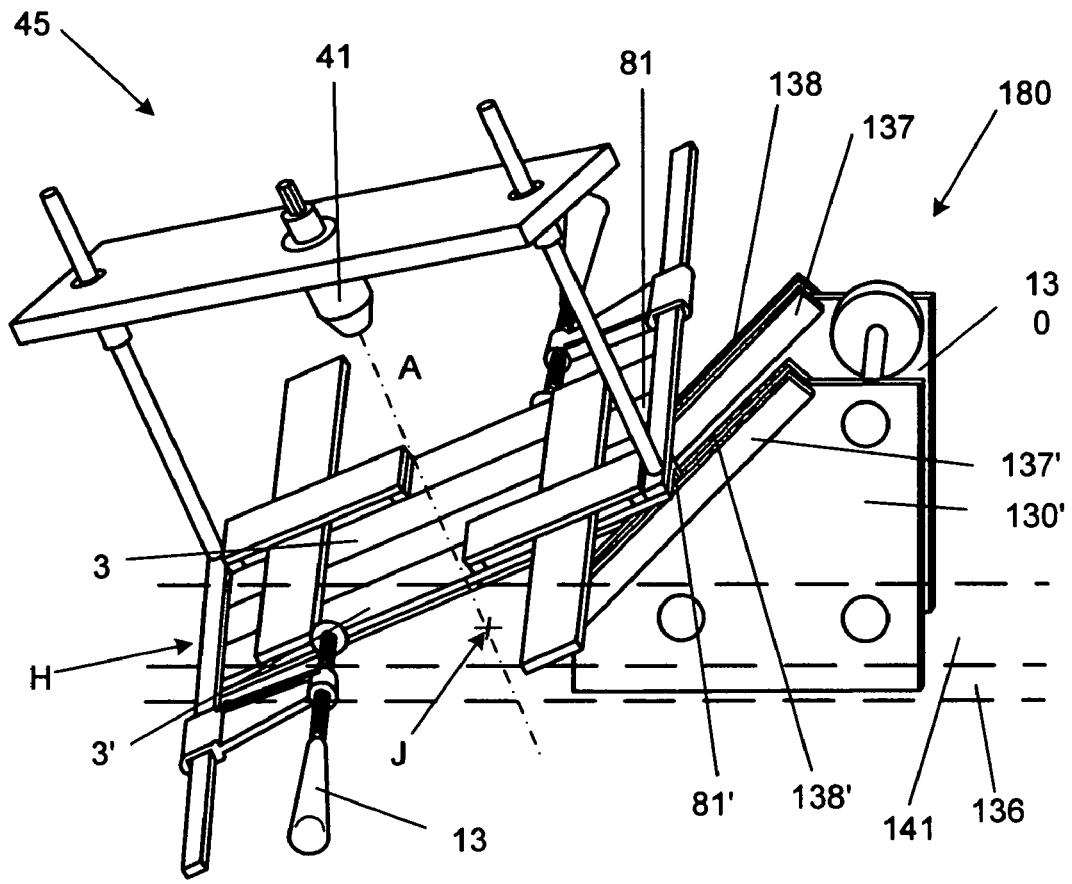
FIG. 14 is a perspective view of the first embodiment of the invention being used with the incline accessory.

FIG. 14 is a perspective view of the first embodiment of the invention being used with the incline accessory 180. To drill a hole at an angle in a workpiece 136, clamp plates 130 and 130' are opened sufficiently to allow accessory 180 to rest on the upper surface 141 of workpiece 136. Wing nuts 134 and 135 (out of sight behind plate 130') may be tightened slightly to restrain accessory 180 from leftward or rightward motion along the workpiece 136. The first embodiment of the invention 45 (for example) is then placed with its left end on top of the workpiece at H, with clamp irons 3 and 3' on either side of the workpiece. At the same time, depending skirts 81 and 81' at the right ends of clamp irons 3 and 3' are placed into track slots 138 and 138' of inclined guides 137 and 137', respectively. Accessory 180 and embodiment 45 are then moved left or right and embodiment 45 moved towards or away from accessory 180 so as to position the centerline A of chuck 41 at the correct position and angle relative to drill point j. Then handle 13 is tightened slightly to pinch the workpiece 136 between clamp irons 3 and 3'. Wing nuts 134 and 135 (not visible) are then tightened fully to secure accessory 180 to workpiece 136. Lock wheel 140 is then adjusted to spread guides 137 and 137' to frictionally engage skirts 81 and 81' in track slots 138 and 138', respectively. Handles 13 and 13' are then fully tightened to secure embodiment 45 to both the workpiece 136 and the accessory 180.

Figure 15:
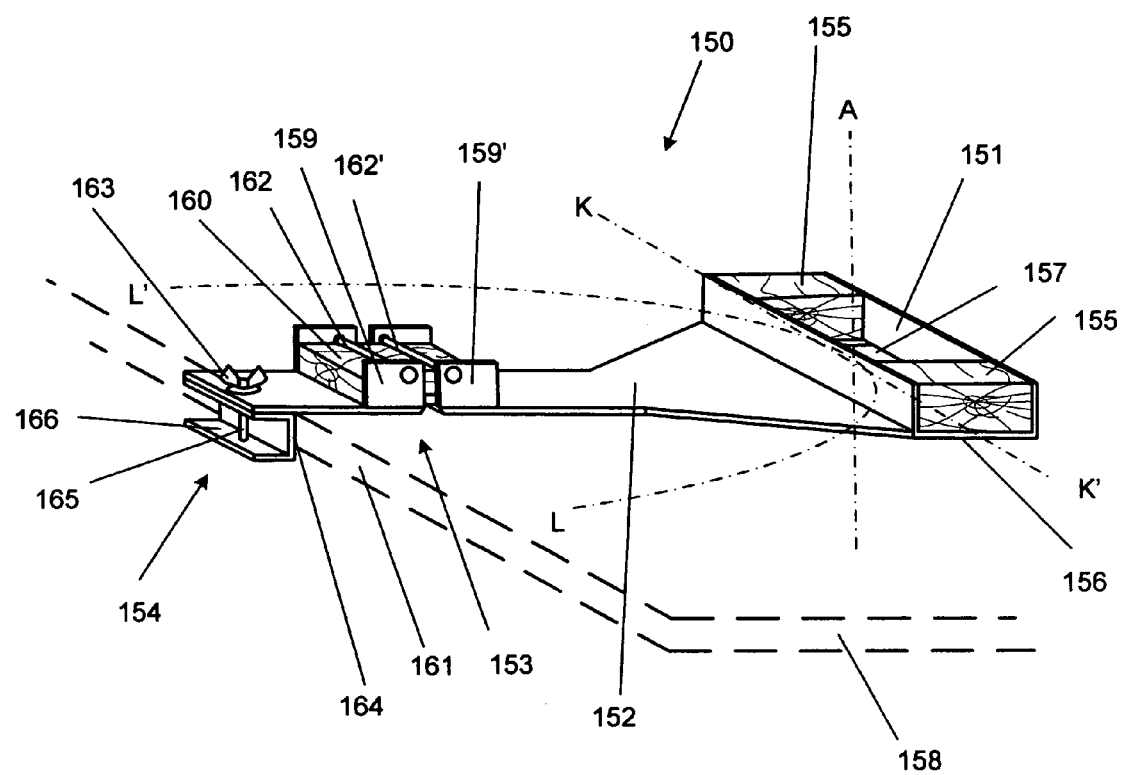
FIG. 15 is a perspective view of a fence accessory for the invention.

FIG. 15 is a perspective view of a fence accessory 150 for the invention. It has a base 151 rigidly attached to an arm 152, which is in turn connected through extension clamps 153 to fence assembly 154. Base 151 is shaped to fit between clamp irons 3 and 3' in previous drawings. Wood blocks 155 are shown built into base shell 156 to provide rigidity, although any other means of making the base capable of withstanding the clamping of irons 3 and 3' is equally satisfactory. A hole 157 is cut into base shell 156 to permit the drill bit in either of the embodiments of the invention to pass through to the underlying workpiece 158. Depending on how far drill axis A needs to be placed from workpiece edge 161, a piece of wood 160 of suitable length can be inserted through extension clamps 159 and 159', and secured in place using extension clamp bolts 162 and 162'. If it is desired to drill plural holes along line K–K', wing nut 163 is tightened so as to position flat 164 of fence assembly 154 against edge 161 of workpiece 158, and the entire apparatus slid along edge 161 to position drill axis A over the selected drill locations. If it is desired to drill plural holes along circular arc L–L', fence assembly 154 is turned around 180 degrees from the position shown about bolt 165, so that cavity 166 can be placed over workpiece edge 161 so far as to place bolt 165 against edge 161. Moderate tightening of wing nut 163 will then cause assembly 154 to grip edge 161 while allowing the entire accessory 150 to swivel about bolt 165. Drill axis A will now be able to be positioned at any point along arc L–L'.

The invention claimed is:

1. A power driver bit self-centering and positioning apparatus for applying rotating bits to a workpiece, comprising:
   a first workpiece clamp assembly having
      a first elongate clamp iron, the elongate iron having a first front edge with a first vertical skirt depending therefrom, the first vertical skirt having a first proximal lower corner at one end and a first distal lower corner at the other, the elongate iron further having a first rear edge, a first proximal end and a first distal end, and a first elongate slide rod rigidly affixed to the first proximal end extending vertically from and at right angles to the elongate axis of the first elongate clamp iron;
   a second workpiece clamp assembly having
      a second elongate clamp iron, the elongate iron having a second front edge with a second vertical skirt depending therefrom, the second vertical skirt having a second proximal lower corner at one end and a second distal lower corner at the other, the elongate iron further having a second rear edge, a second proximal end and a second distal end, and a second elongate slide rod rigidly affixed to the second proximal end extending vertically from and at right angles to the elongate axis of the second elongate clamp iron;

the second workpiece clamp assembly rotated about the axis of the second elongate slide rod 180 degrees and positioned relative to the first workpiece clamp assembly so that the second vertical skirt faces, and is parallel to, the first vertical skirt;

means for pushing the first and second vertical skirts towards each other so as to clamp a workpiece from opposite sides;

a rigid elongate chuck assembly holder with first and second vertical slide rod guide holes drilled through either end, the guide holes sized to slip fit the slide rods, and a chuck assembly bearing having a vertical axis placed at a prescribed position between the centers of the slide rod guide holes;

a chuck assembly disposed within the bearing and having a chuck below the holder capable of gripping rotating bits, and a shank above the holder capable of being driven by the chuck of a power driver, the shank being rigidly attached coaxially with the chuck so that when the shank is driven, the chuck rotates;

the elongate slide rods of the first and second workpiece clamp assemblies being inserted into the first and second slide rod guide holes, respectively.

2. The apparatus of claim 1, wherein:
said prescribed position is either a) adjustable, or b) halfway between the centers of said slide rod guide holes.

3. The apparatus of claim 2, wherein:
said means for urging said first and second vertical skirts towards each other comprises:

a first slide rail fixedly attached to said first proximal end of said first workpiece clamp assembly, at mutual right angles to said first clamp iron and said first slide rod and extending toward said second workpiece clamp assembly;

a second slide rail fixedly attached to said second proximal end of said second workpiece clamp assembly, at mutual right angles to said second clamp iron and said second slide rod and extending toward said first workpiece clamp assembly;

a first elongate sliding arm having an inner end and an outer end, the outer end shaped to slide upon the first slide rail at right angles to the first slide rail and to maintain the elongate axis of the first arm substantially parallel to said first clamp iron, the inner end having a first threaded hole accommodating a first threaded clamp screw, the first threaded clamp screw being substantially parallel to the first slide rail and having a back end and a front end, the front end having a first swivel pad pivotably attached thereto and facing said first clamp iron, the back end having a handle attached thereto extending away from said first clamp iron;

a second elongate sliding arm having an inner end and an outer end, the outer end shaped to slide upon the second slide rail at right angles to the second slide rail and to maintain the elongate axis of the second arm substantially parallel to said second clamp iron, the inner end of the second sliding arm having a second threaded hole accommodating a second threaded clamp screw, the second threaded clamp screw being substantially parallel to the second slide rail and having a back end and a front end, the front end having a second swivel pad pivotably attached thereto and facing second clamp iron, the back end having a handle attached thereto extending away from said second clamp iron;

the first threaded clamp screw being turned to a position yielding a first space between said first vertical skirt and the first swivel pad, and the second threaded clamp screw being turned to a position yielding a second space between said second vertical skirt and said second swivel pad; and said first elongate clamp iron being placed in said second space so as to position the second swivel pad against said first rear edge of said first elongate clamp iron, and said second elongate clamp iron being placed in said first space so as to position the first swivel pad against said second rear edge of said second elongate clamp iron.

4. The apparatus of claim 3, further comprising:
means for aligning said first workpiece clamp assembly in a spatial orientation relative to said second workpiece clamp assembly wherein said first slide rod is maintained parallel to said second slide rod.

5. The apparatus of claim 4, wherein:
said means for aligning comprises a first elongate slot bar having a forward end and a rearward end, the rearward end being fixed on top of said distal end of said first elongate clamp iron in an orientation parallel to said first slide rail, the first slot bar having a cross-section of a first shape;

a second elongate slot bar having a forward end and a rearward end, the rearward end being fixed on top of said distal end of said second elongate clamp iron in an orientation parallel to said second slide rail, the second slot bar having a cross-section of a second shape;

a first sleeve rigidly affixed on top of said proximal end of said first elongate clamp iron, the first sleeve forming a slot having a cross-section of the second shape, the first sleeve having an axis parallel to the first slot bar, and a second sleeve rigidly affixed on top of said proximal end of said second elongate clamp iron, the second sleeve forming a slot having a cross-section of the first shape, the second sleeve having an axis parallel to the second slot bar; and the front end of the first slot bar sliding within the second sleeve and the forward end of the second slot bar sliding within the first sleeve.

6. The apparatus of claim 5, further comprising:
an incline accessory comprised of a first and a second matching flat rigid vertical plates, each plate having a bottom edge, a rear edge, a top edge, a front edge, a diagonal edge truncating the corner between the front edge and the top edge, and each plate further having a first guide and a second guide, respectively, attached to each plate along each diagonal edge;

the first guide having formed into its elongate centerline a first track slot, and the second guide having formed into its elongate centerline a second track slot, the plates being joined by two bolts with wing nuts, the holes for the bolts being positioned above the bottom edge and at right angles to both plates, and the wing nuts capable of drawing the bottom of the plates closer together;

the plates being connected by a third bolt, also at right angles to both plates, the third bolt being fixed at one end to one of the plates and having a wheel threadedly mounted on it between the plates, so that the wheel can be rotated and moved against the other plate, pushing the top half of the plates farther apart;

said second proximal lower corner of said second workpiece clamp assembly being placed in the first track slot, and said first distal lower corner of said first workpiece clamp assembly being placed in the second track slot.

7. A power driver bit self-centering and positioning apparatus for applying rotating bits to a workpiece, comprising: two identical rigid subassemblies,
   each further comprising a section of angle iron in a horizontal position with one flat facing upward, the other flat facing forward, the upward-facing flat having a rear edge, and the forward-facing flat having a first depending end corner and a second depending end corner;
   an elongate rigid slide rod of round cross-section affixed to one end of the upward facing flat of the angle iron and extending upward;
   an elongate rigid rail of rectangular cross-section affixed to the bottom of the slide rod and extending forward at right angles to both the slide rod and the angle iron;
   a first elongate rigid flat bar of a width substantially the same as that of the angle iron, affixed to the top of the angle iron about two-thirds of the way toward the other end of the angle iron and facing forward at right angles to the angle iron;
   a rigid sleeve fixedly attached to the top of the angle iron adjacent to the base of the slide rod, having a cross-section large enough and of the same shape and orientation as to hold slidingly a second elongate rigid flat bar parallel to the first flat bar;
   a sliding arm having a rectangular hole in one end and a threaded hole in the other, the rectangular hole sliding over the free end of the rigid rail, a threaded screw being threaded into the threaded hole, the threaded screw being perpendicular to the angle iron and having a handle at one end and a swivel pad at the other, the handle facing away from the angle iron and the swivel pad facing toward the forward-facing flat of the angle iron;
one of two rigid subassemblies rotated 180 degrees about a vertical axis relative to the other of the two rigid subassemblies, the flat bars of each being inserted into the sleeves of the other, so that the two rigid rails and the two angle irons form a rectangle with the two slide rods extending upward from opposite corners;

a rigid, rectangular chuck holder with two cylindrical bushings of equal diameter installed through vertical holes in opposite ends, and a bearing also with a vertical axis installed at center point between the vertical holes;
a chuck assembly installed through the bearing, the chuck assembly further comprising a first chuck for holding a bit below the bearing, and a shank capable of being turned by a second chuck of a power driver;
the chuck holder being installed on the two rigid subassemblies by sliding the bushings downward over the slide rods; and
the swivel pad of one subassembly being positioned against the rear edge of the other, so as to permit a workpiece to be clamped between the forward-facing flat of one subassembly and the forward facing flat of the other subassembly.

8. The apparatus of claim 7, further comprising:
an incline accessory comprised of a first and a second matching flat rigid vertical plates, each plate having a bottom edge, a rear edge, a top edge, a front edge, a diagonal edge truncating the corner between the front edge and the top edge, and each plate further having a first guide and a second guide, respectively, attached to each plate along each diagonal edge;
the first guide having formed into its elongate centerline a first track slot, and the second guide having formed into its elongate centerline a second track slot,
the plates being joined by two bolts with wing nuts, the holes for the bolts being positioned above the bottom edge and at right angles to both plates, and the wing nuts capable of drawing the bottom of the plates closer together;
the plates being connected by a third bolt, also at right angles to both plates, the third bolt being fixed at one end to one of the plates and having a wheel threadedly mounted on it between the plates, so that the wheel can be rotated and moved against the other plate, pushing the top half of the plates farther apart;
said first depending end corner of said one rigid subassembly being placed in the first track slot, and said second depending end corner of said other rigid subassembly being placed in the second track slot.

* * * * *